(12) United States Patent
Herrala

(10) Patent No.: US 8,994,939 B2
(45) Date of Patent: Mar. 31, 2015

(54) IMAGING SPECTROMETER

(75) Inventor: Esko Herrala, Oulu (FI)

(73) Assignee: Specim, Spectral Imaging Oy Ltd, Oulu (FI)

( * ) Notice: Subject to any disclaimer, the term of this patent is extended or adjusted under 35 U.S.C. 154(b) by 374 days.

(21) Appl. No.: 13/275,698

(22) Filed: Oct. 18, 2011

(65) Prior Publication Data

US 2012/0105845 A1     May 3, 2012

(30) Foreign Application Priority Data

Nov. 1, 2010   (FI) ...................................... 20106141

(51) Int. Cl.
    *G01J 3/28*       (2006.01)
    *G01J 3/02*       (2006.01)

(52) U.S. Cl.
    CPC ............... *G01J 3/021* (2013.01); *G01J 3/0208* (2013.01); *G01J 3/0243* (2013.01)
    USPC ........................................................ 356/326

(58) Field of Classification Search
    CPC ......................................................... G01J 3/28
    USPC ........................................................ 356/326
    See application file for complete search history.

(56) References Cited

U.S. PATENT DOCUMENTS

| | | | |
|---|---|---|---|
| 6,263,134 B1 | 7/2001 | Laude | |
| 6,538,736 B1 * | 3/2003 | Palumbo | ........................ 356/326 |
| 6,597,452 B1 | 7/2003 | Jiang et al. | |
| 2004/0090623 A1 | 5/2004 | Richman | |
| 2006/0164639 A1 * | 7/2006 | Horn et al. | ..................... 356/326 |

FOREIGN PATENT DOCUMENTS

| EP | 1193482 A1 * | 4/2002 |
|---|---|---|
| WO | WO0227286 A1 | 4/2002 |

OTHER PUBLICATIONS

Olli-Pekka Sievanen, Finnish Search Report for corresponding Finnish Application No. 20106141, p. 1 (Sep. 1, 2011).

* cited by examiner

*Primary Examiner* — Tarifur Chowdhury
*Assistant Examiner* — Omar Nixon
(74) *Attorney, Agent, or Firm* — Hoffmann & Baron, LLP

(57) ABSTRACT

Optical radiation from a sample is received by the slit and it is passed through an aperture in a reflective plane of a folding mirror towards a curved reflective surface of a collimating mirror. The slit and the curved reflective surface have a common optical axis. The reflective plane and the curved reflective surface face each other. The optical radiation passed through the folding mirror is collimated by the curved reflective surface. The collimated optical radiation is directed to the reflective plane of the folding mirror by the curved reflective surface. The collimated optical radiation is reflected in a direction other than the common optical axis of the slit and the curved reflective surface by the reflective plane.

16 Claims, 4 Drawing Sheets

IMAGING SPECTROMETER

CROSS-REFERENCE TO RELATED APPLICATION

This application claims priority based on Finnish Application No. 20106141, filed Nov. 1, 2010, which is incorporated herein by reference.

BACKGROUND

1. Field

The exemplary and non-limiting embodiments of this invention relate generally to an imaging spectrometer.

2. Description of the Related Art

A spectrometer is an optical device which receives optical radiation and separates light by wavelengths to produce a spectrum. The spectrum, which may also be called a spectral density, is a distribution of intensity of the optical radiation input to the spectrometer as a function of a wavelength. A detecting element transforms the spectrum into an electrical form after which a signal processor may be used to analyze the spectrum by, for example, quantifying the amount of each wavelength component that is present in the input optical radiation.

An imaging spectrometer is a device which allows simultaneous spatial and spectral information to be collected from a sample. The imaging spectrometer provides a distribution of intensity of the optical radiation as a function of both a wavelength and a location.

There are several kinds of optical configurations for the spectrometers, depending on the nature of operation principle. Prism(s), concave or plane reflective gratings or transmission gratings can be used as the dispersive component. Both reflective mirrors and lenses may be used for collimating and focusing and they can modify the wavefronts incident on and diffracted by the grating. Some commonly known layouts are Czerny-Turner-, Ebert- and Off-ner-designs.

There are problems with older designs, such as Czerny-Turner- and Ebert-types. The designs have a limited flat field image, and a strong aberration due to mirrors, which are on both sides of the dispersive component. Additionally, the reflective surfaces are at an angle with respect to the optical axis i.e. they are optical subsystems operating in off-axis.

A dominant off-axis aberration associated to an off-axis reflective optical component is usually coma, but also astigmatism appears. The main image surface deformation is a field curvature. Additionally, smile and Key-stone become a problem. Hence, a point becomes a large spot and image is distorted on the detecting element and this is a reason why they cannot be used with a two-dimensional detecting element in a high resolution spectroscopy. Offner-design is only a slightly better because of a curved surface grating which is an attempt to compensate the aberrations caused by the off-axis mirrors. However, Offner-design still has too strong aberrations for spectroscopy with a good resolution.

That detecting is performed at the same side of the spectrometer as the input of the optical radiation is also common to Czerny-Turner-, Ebert- and Offner-designs. Such a configuration causes the detector, such as a camera, to physically hinder the optical input to the spectrometer. An additional mirror may be used to deflect the optical output for obtaining space for the input but this only increases the already disadvantageous complicatedness and cost of the spectrometer.

In some spectrometers, at least one refractive optical component is used to collimate the optical radiation before the dispersive component instead of a mirror for an optical on-axis operation to avoid off-axis aberrations. However, the at least one refractive optical component causes a chromatic aberration to the optical radiation to be dispersed which naturally deteriorates the accuracy of the spectrometer substantially. Additionally, a zero-deviation dispersive component itself causes smile and Keystone which are unsymmetrical relative to the optical axis, which deteriorates the accuracy of the spectrometer, too. Hence, there is a need for a good imaging spectrometer.

SUMMARY

According to an aspect of the present invention, there is provided an optical collimating system for an imaging spectrometer as specified in claim 1.

According to another aspect of the present invention, there is provided a method.

Preferred embodiments of the invention are disclosed in the dependent claims.

The invention provides advantages. The aberrations and image distortions including smile and Keystone due to mirrors, lenses and/or dispersive component can be eliminated efficiently.

BRIEF DESCRIPTION OF THE DRAWING

Embodiments of the present invention are described below, by way of example only, with reference to the accompanying drawings, in which.

DETAILED DESCRIPTION

Exemplary embodiments of the present invention will now be described more fully hereinafter with reference to the accompanying Figures, in which some, but not necessarily all embodiments of the invention are shown. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Therefore, all words and expressions should be interpreted broadly and they are intended to illustrate, not to restrict, the embodiment.

Figure 1:
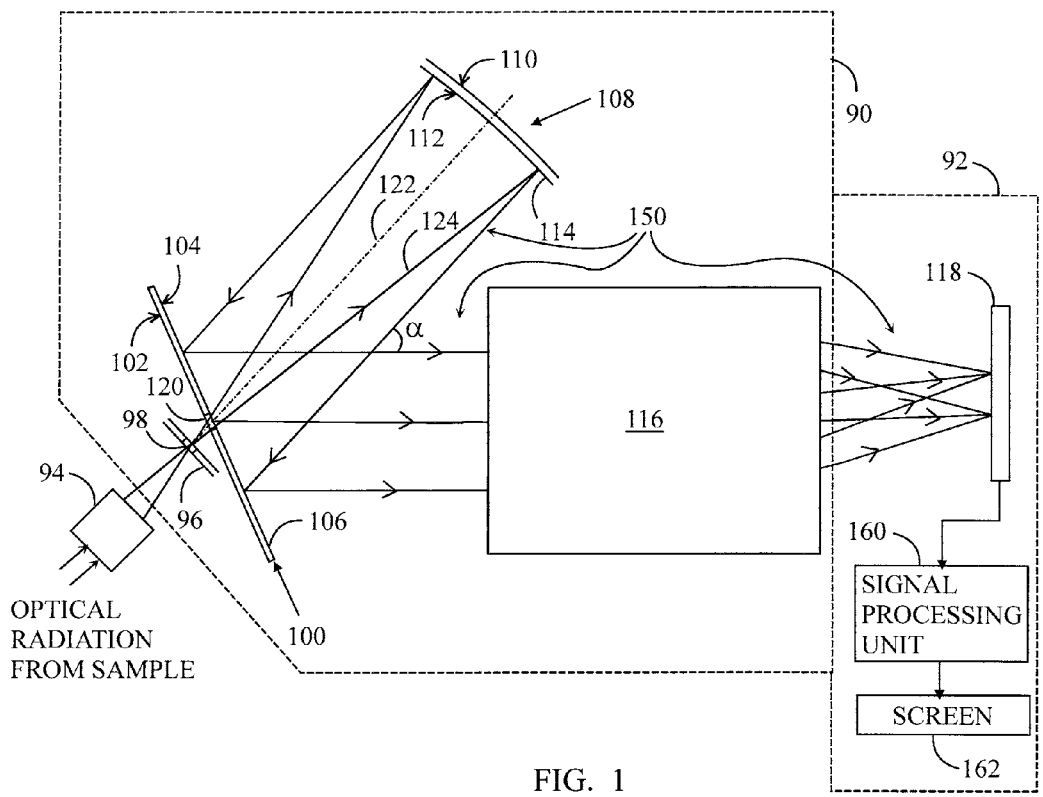
FIG. 1 shows the general architecture of the optical system.

A general architecture of an imaging spectrometer is illustrated in FIG. 1 which is a simplified representation and shows only some elements and functional entities. The implementation of the imaging spectrometer may differ from what is shown.

An imaging spectrometer is a device which allows for simultaneous location and spectral information to be collected from a sample for high resolution information on the spectral signature of the sample. The sample may range from a (small) piece of matter to a (large) land area imaged from the air.

There are a wide range of imaging spectrometer applications for scientists and engineers in research and development, for doctors in medical diagnostics, for farmers in precision farming in agriculture, for quality control in processing industry, and recycling of plastics and other materials.

The imaging spectrometer may also be used to form images with spectrum of land for vegetation health, forest inventory, geological exploration, water quality and other environmental monitoring applications. The imaging spectrometer may also be suitable in the fields of security and various sorts of target detections. The formed images with spectral information may comprise video and/or still images.

The imaging spectrometer may comprise a spectrograph 90, a measuring part 92 and an optical element 94. The spectrograph 90 of the imaging spectrometer comprises a slit component 96, a folding mirror 100, a collimating mirror 108, a dispersive and imaging element 116. The measuring part 92 comprises a two-dimensional detecting element 118 for detecting spatial and spectral information. Additionally, the measuring part 92 may comprise a signal processing unit 160 and means 162 for presenting results. The slit component 96 comprises a slit 98 for the spectrometer. The folding mirror 100 comprises an aperture 120 the size of which may be the same as the slit 98 of the slit component 96 or larger.

The optical element 94 is placed between a sample and the spectrograph 90 and it may form an image of a sample in the slit 98 through which the optical radiation may propagate to the folding mirror 100. The image of the sample does not need to be a full image of the sample but only a part of the sample may also be imaged. Since the folding mirror 100 has the aperture 120, the optical radiation may travel towards the collimating mirror 108.

The folding mirror 100, which may be a plane mirror and the collimating mirror 108 form a collimating system for the imaging spectrometer. In an embodiment, the folding mirror 100 may comprise a reflective plane 106 on the rear surface 104, for example. A reflective plane is a flat and optically smooth surface for a specular reflection to take place when optical radiation has an interaction therewith. Alternatively, the reflective plane 106 of the folding mirror 100 may reside on the front surface 102. For a further alternative, the reflective plane 106 of the folding mirror 100 may reside between the front surface 102 and the rear surface 104. These latter embodiments are not shown since they are so clear variations per se to what is presented in FIG. 1.

The optical radiation in this application means a wavelength range from 200 nm to 14000 nm but is not necessarily restricted to this. A band of optical radiation used in a certain application of the spectrometer may be narrower, however.

In an embodiment, the collimating mirror 108 may comprise a curved reflective surface 114 on the front surface 112 of the collimating mirror 108. The curvature of the curved reflective surface 114 may be spherical or aspheric. Alternatively, the reflective surface 114 of the collimating mirror 108 may reside on the rear surface 110. For a further alternative, the reflective surface 114 may reside between the front surface 112 and the rear surface 110 of the collimating mirror 108. Similarly to the explanation with respect to the folding mirror 100, these latter embodiments are not shown since they are so clear variations per se to what is presented in FIG. 1.

The reflective plane 106 of the folding mirror 100 and the curved reflective surface 114 of the collimating mirror 108 are facing each other.

The slit 98 may be elongated having a length much larger than its height although the shape of the slit 98 is not restricted to this. The slit 98 and the curved reflective surface 114 may have a common optical axis 122 which makes the spectrometer to function on-axis.

The optical axis means a conceptional line along which optical radiation travels through an optical system. The optical axis penetrates centers of curvatures of all surfaces of optical components. The centers of curvatures may be the same as the points of rotational symmetry of the optical components. The mechanical axis and the optical axis 122 of the slit 98 and the reflective surface 112 of the collimating mirror 108 are made to coincide or to at least nearly coincide.

The purpose of the curved reflective surface 114 is to collimate the optical radiation 124 coming from the slit 98 and aperture 120 and to direct the collimated optical radiation 124 to the reflective plane 106 of the folding mirror 100. In collimation, beams of optical radiation that are divergent are converted to parallel or at least almost parallel beams, the divergence or convergence of beams being negligible to the final result. That means that the beams are parallel practically but not theoretically.

The distance between the curved reflective surface 114 and the slit 98 is dimensioned such the optical radiation diverging out of the slit 98 will become collimated when reflecting from the curved reflective surface 114. The stronger curvature of (i.e. shorter radius of curvature) the curved reflective surface 114, the closer to the slit 98 the curved reflective surface 114 should be. And vice versa, the closer to the slit 98 the curved reflective surface 114 is placed, the stronger curvature of the curved reflective surface 114 should be.

There is a plurality of aberrations which an optical refracting or reflecting component may generate. An optical system without aberrations forms its image according to paraxial theory and hence the difference between the paraxial theory and the real image is a measure for aberration. Typical aberrations, called third order aberrations (of the third order term in Snell's law) are spherical aberration (both lateral and longitudinal), coma, astigmatism, field of curvature, distortion aberration and chromatic aberration. However, the higher order aberrations may still be a problem although often that is not the case.

The curved reflective surface 114 which is on-axis does not introduce large geometrical aberrations present in off-axis designs. The curved reflective surface 114 which functions as a collimator does not introduce chromatic aberrations which are present in collimating lenses.

The reflective plane 106 reflects the collimated optical radiation 124 to the dispersive and imaging element 116 in a direction other than the common optical axis 122 of the slit 98 and the curved reflective surface 114. An angle α between the direction of reflection from the reflective plane 106 and the optical axis 122 may be 30° to 150°, for example. However, the collimating system is not restricted to that.

A folded structure made by the tilted reflective plane 106 providing the angle α for the input and the output allows for an extremely compact and small design still having the optical input and output at different or even nearly opposite sides of the spectrometer.

The dispersive and imaging element 116 forms a spectrum of the received optical radiation 124 of every point along the length of the slit 98 on the two-dimensional detecting element 118. Typical detecting elements may be based on silicon, such as CCD (Charge Coupled Device) or CMOS (Complementary Metal Oxide Semiconductor) in the visible wavelength range and In—GaAs (Indium Gallium Arsenide) or MCT (Mercury Cadmium Telluride) in the infrared region.

The two-dimensional detecting element 118 transforms the spectrum to an electrical signal such that both spectral information and the location information are available simultaneously. Data in the electrical signal may be processed in a signal processing unit 160. Information based on the data may be presented to a person interested in a result of a spectroscopic measurement on a screen 162. The data may also be used to control an instrument or a machine.

Figure 2:
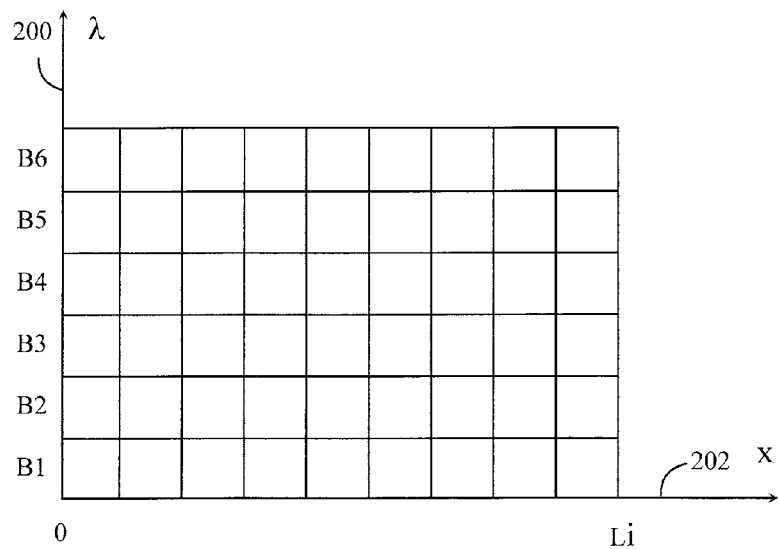
FIG. 2 shows a spectrum as a function of location.

FIG. 2 presents a simplified the two-dimensional detecting element 118 which has an image of the sample with different wavelengths of the spectrum on it. The detecting element 118 comprises pixels (squares in FIG. 2) in a two-dimensional matrix form. The dispersive and imaging element 116 spreads intensities of the optical radiation as a function of wavelengths λ in one dimension 200 on the two-dimensional detecting element 118. The dispersive and imaging element 116 forms an image of a sample through the slit 98 for having a simultaneous location dependence of the wavelength dependent intensities in another dimension 202. The slit 98 may be a slit having a small dimension in height, but a large dimension in length.

If the height of the image of the slit 98 is the same as the height of a pixel, the slit 98 may be imaged with a wavelength band B1 on the lowest row of the pixels. On the next row, the slit 98 is imaged with a wavelength band B2 and so on. The highest row has the image of the slit 98 illuminated with a wavelength band B6. The bands B1 to B6 may have a desired bandwidth, which may vary from a single wavelength to hundreds of nanometers, for instance.

The spectrum is a continuum from zero to the length Li of the image of the slit 98. The two-dimensional detecting element 118 may transform the optical information associated to the both wavelength λ and location x dependent intensities to electrical data simultaneously. In general, the height of the image of the slit 98 may be the same as or less than the height of a pixel of the detecting element 118. The length of the image of the slit 98 may be the same or approximately the same as the length of the detecting element 118.

A pixel may be a rectangular or a square a side of which may be about five to fifty micrometers, for example. The imaging spectrometer is not limited to such measures, however. Due to the design of the imaging spectrometer, the aberrations are so much reduced that they do not practically deform the image or the spectrum. Hence, one pixel may define the width of each wavelength band B1 to B6. If aberrations deformed the pattern of the image and the spectrum, a computer program in the signal processing unit 160 would be needed to calculate an intensity of in a band at a certain location on the basis of detections on a plurality of pixels. Such an imaging spectrometer which requires computational aberration cancellation can not give as accurate results as an imaging spectrometer with a proper optical aberration cancellation.

In an embodiment, the collimating mirror 108, the folding mirror 100, the dispersive and imaging element 116 and the two-dimensional detecting element 118 are parts at least two of which are separated from each other by a gap 150 of air. In an embodiment, all parts may be separated from each other by gaps 150 of air. If the spectrometer is in a hermetical case, a gas or liquid may be used instead of air in the gaps 150.

Figure 3A:
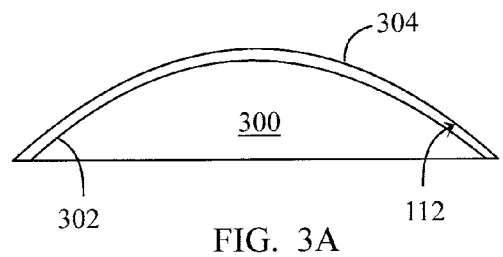
FIG. 3A presents a plano-convex lens with a metal layer on the curved surface.

FIG. 3A presents an embodiment of a structure of the collimating mirror 108. The collimating mirror 108 may comprise a plano-convex lens 300 the curved surface 302 of which may be covered with a metal layer 304. The surface of the metal layer 304 against the curved surface 302 of the plano-convex lens 300 forms a curved reflective surface 112 which reflects the optical radiation interacting with it. The plano-convex lens 300 may be of plastic or glass, for example.

Figure 3B:
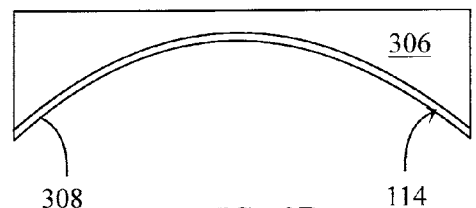
FIG. 3B presents a curved reflective mirror based on a convex body.

FIG. 3B presents an alternative embodiment of a structure of the collimating mirror 108. The collimating mirror 108 may comprise a concave body 306 having a metal surface 308 which forms a curved reflective surface 112 which reflects the optical radiation interacting with it. The body 306 may be of metal, glass or plastic, for instance. If the body 306 is of glass or plastic, the metal surface 308 may be a metal layer on the body surface. If the body 306 is of metal, the surface 308 may be of the same material as the body 306 with or without a discontinuity. If the surface 308 does not comprise a separate metal layer, the surface 308 of the body 306 should be polished with accuracy of optical purposes, however.

Figure 4:
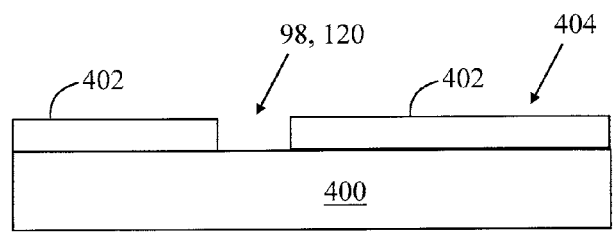
FIG. 4 presents a structure of the slit and/or the aperture.

FIG. 4 shows an embodiment of a structure of the slit 98 and/or the aperture 120. The slit component 96 may comprise a piece 400 of transparent material such as glass or plastic and metal layer 402 on the rear surface 404 of the piece 400 of the transparent material. The front surface 406 of the piece 400 of the transparent material may be the front surface 102 of slit component 98. Alternatively, the metal layer 402 may reside on the front surface 406 of the piece 400 of the transparent material. The metal layer 402 may have the optical slit 98 which may be made by etching.

The optical aperture 120 of the folding mirror 100 may be made in a similar manner. When following the structure shown in FIG. 4, the front surface 406 of the piece 400 of the transparent material may be the front surface 102 of the folding mirror 100.

In an embodiment, the optical aperture 120 and the slit 98 may be combined such that the imaging spectrometer does not have the slit component 96 and the folding mirror 100 separately, but they are combined. Hence, the slit 98 may be the aperture 120 of the folding mirror 100. Such a structure is presented in FIG. 5.

In an embodiment, the imaging spectrometer comprises a separate slit component 96 with the slit 98 from the folding mirror 100.

In an embodiment, the slit component 98 is of non-transparent material and it comprises a through hole as the slit 96. The hole of the slit 96 may be filled with a transparent material of optical quality for imaging.

The metal layers 304, 402 in FIGS. 3 and 4 may comprise chromium and/or aluminum, for example. However, practically any metal may be used. The metal may be sputtered or vaporized on a supporting structure.

Figure 5:
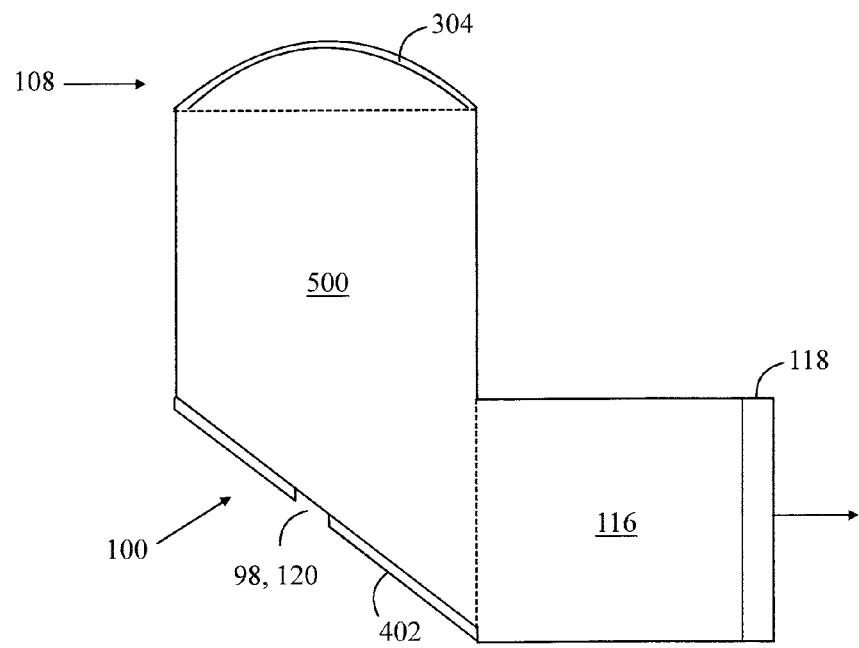
FIG. 5 shows an integrated structure of spectrometer.

FIG. 5 presents an embodiment, where the spectrometer may comprise an optically transparent body 500, which is placed between the collimating mirror 108 and the folding mirror 100 which may comprise the slit 98 in this example. The body 500 which may be of glass or plastic, for instance, may be attached to the collimating mirror 108 and/or to the folding mirror 100 without an air gap. The body 500 may be glued with a transparent glue to the collimating mirror 108 and/or the folding mirror 100. The combination of the transparent body 500, the collimating mirror 108 and the folding mirror 100 may be integrated together such that they form one united and/or solid structure.

In an embodiment, the collimating mirror 108, body 500 and the folding mirror 100 may be integrated together such that they form one solid structure which may have been made of homogenous material without discontinuities, except for the metal layers 304, 402 on the rear surface 110 of the curved reflective mirror 108 and on the front surface 102 of the folding mirror 100. Hence, the collimating mirror 108 may be made of the metal layer 304 alone and the folding mirror 100 may be made of the metal layer 402 alone.

In an embodiment, the folding mirror 100 comprises only the front surface 102 in a position such that a total internal reflection takes place when the optical radiation from the curved reflective mirror 108 becomes into an interaction with the front surface 102. If the refractive coefficient of the material of the folding mirror 100 is about 1.55, for instance, which corresponds to a refractive coefficient of a glass, an angle between the normal of the front surface 102 and the optical radiation should be less that about 40°. That is, an angle between a vector parallel to the front surface 102 and the optical radiation should be more than about 50°.

FIG. 5 further shows an embodiment where the dispersive and imaging element 116 may be attached to the transparent body 500 without a gap of air. The dispersive and imaging element 116 may be attached to the transparent body 500 using proper glue, for instance. The combination of the dispersive and imaging element 116 and the transparent body 500 may thus be integrated.

FIG. 5 still further shows an embodiment where the detecting component 118 may be attached to the dispersive and imaging element 116 without a gap of air. The dispersive and imaging element 116 may be attached to the detecting component 118 using proper glue, for instance. Such a structure is strong against vibration and temperature variation and temperature gradient.

Figure 6:
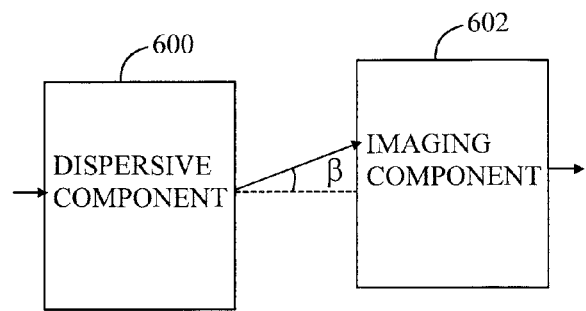
FIG. 6 shows the dispersive and imaging component.

FIG. 6 presents the dispersive and imaging element 116 which may comprise a dispersive component 600 and at least one lens 602. The dispersive component 600 comprises at least one prism and/or at least one plane transmission grating. The dispersive component 600 may have a non-zero deviation which means that the direction at which the optical radiation is input to the dispersive component 600 differs from the average, mean or main direction of the output optical radiation from the dispersive component 600.

Since a chromatic aberration is less problematic after the dispersive component 600, the at least one lens 602 may actually be designed to at least partly eliminate any aberration caused by the dispersive component 600. The at least one lens 602 after the dispersive component 600 may also provide a short focal length to make the imaging spectrometer compact.

The at least one lens 602 may be optimized for the imaging spectrometer using a suitable computer program. The parameters for the computer program may be radiuses of curvatures, optical material, thickness, number of the at least one lens etc. The optimization may minimize the total aberration of the pattern of the image and the spectrum on the detecting element 118. The optimization may also be based on at least one of the following variable: weight, size, price etc. of the at least one lens. Without a proper computer program a person skilled in the art may additionally or alternatively perform calculations and/or tests of a suitable lens system. Theoretically, it is possible to design the optical parameters of the at least one lens 602 so that a total or partial cancellation of the aberrations of the dispersive component 600 may be achieved.

Since the aberrations may be partly or completely eliminated, a very good image quality is possible. The good image quality, in turn, enables the use of a detecting element 118 with a large surface area such as 20 mm×20 mm or 35 mm×35 mm. A combination of good image quality, a large detecting element with small pixels results in a possibility of a high resolution spectroscopy.

Define now two aberrations that appear often in association with imaging spectrometers. Smile can be determined as an image aberration where a spectral calibration is different at different locations in the slit. Keystone can be defined as wavelength dependent magnification error in different locations in the slit.

Figure 7:
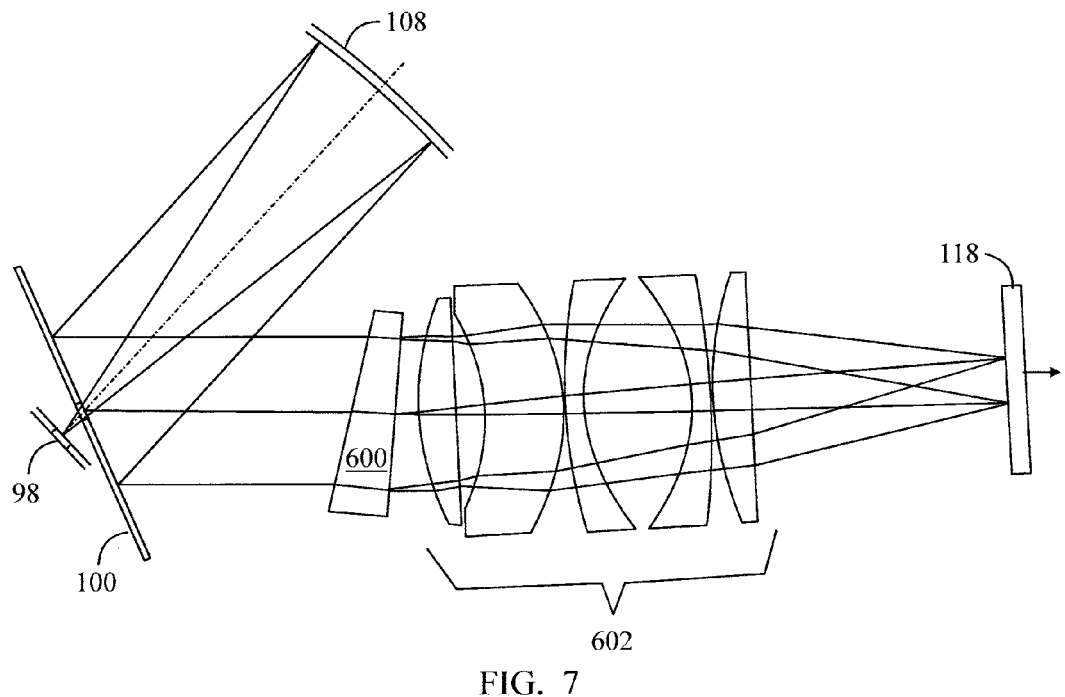
FIG. 7 presents an example of a detailed configuration of the spectrometer.

Examine now the imaging spectrometer with further details. FIG. 7 presents a configuration of the optical parts of the spectrometer with some rays for illustrating the operation. The optical radiation from a sample travels through the slit 98 and the folding mirror 100 to the curved reflective mirror 108 which reflects the optical radiation back to the folding mirror 100 in a collimated form. The folding mirror 100 reflects the collimated optical radiation to the dispersive element 600 which disperses the optical radiation into a spectrum and may turn the main direction of the optical radiation by a non-zero deviation angle β. The at least one imaging lens 602 forms an image of the sample with a location dependent spectrum on the two-dimensional detecting element 118. The signal processing unit 160 processes the signal with the data on the spectral location pattern transformed into an electrical form by the detecting element 118.

A deviation angle β other than zero is allowed between the optical axis of the reflective plane 106 and the at least one lens 602, and therefore the dispersive component 600 may not be of zero-deviation type. Instead, the dispersive component 600 may be placed in the imaging spectrometer such that it provides a deviation angle β that makes the smile for the shortest wavelength have the same magnitude but the opposite sign as the smile for the longest wavelength. The actual deviation angle β may typically be in a range of 1° to 10°, for example.

If the dispersive component 600 is set to a position providing said non-zero deviation, a behavior corresponding to that of the smile will also be true for the Keystone at the outer left and right field points. With the non-zero deviation, the pattern on the two-dimensional detecting element 118 will consequently be symmetric about the vertical and horizontal lines through the centre of the pattern.

Then, the tilting angle of the at least one lens 602 may be chosen such that the center point of the pattern lies on the optical axis of the at least one lens 602. The optical axis of the at least one lens 602 may be tilted such that the center wavelength is on-axis. The smile and Keystone lines (in the image and the spectrum) now form a distorted pattern of the same form as a normal third or higher order distortion of a symmetrical optical system. Because of that, the at least one lens 602 can be designed to have the same distortion, but of opposite sign, for cancelling the aberrations caused by the dispersive component 600. In theory, the smile and Keystone aberrations can be reduced to zero.

Figure 8:
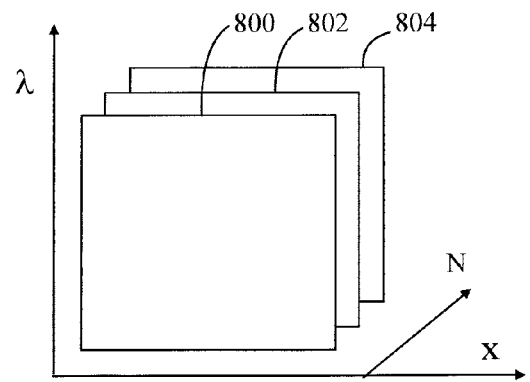
FIG. 8 presents a hyperspectral datacube.

FIG. 8 presents a hyperspectral datacube. The hyperspectral data is the data which is based on the electrical signal of the detecting element 118 and which may be formed in a signal processing unit 160. The hyperspectral data comprises a set of collected images 800 to 804 where each image represents a range of the electromagnetic spectrum in one axis and spatial location in another axis. The number of images formed with different optical bands may vary from two to millions. These images may then be combined to form a three dimensional hyperspectral datacube for further processing and analysis. In theory, there is no upper limit of combinable images.

Figure 9:
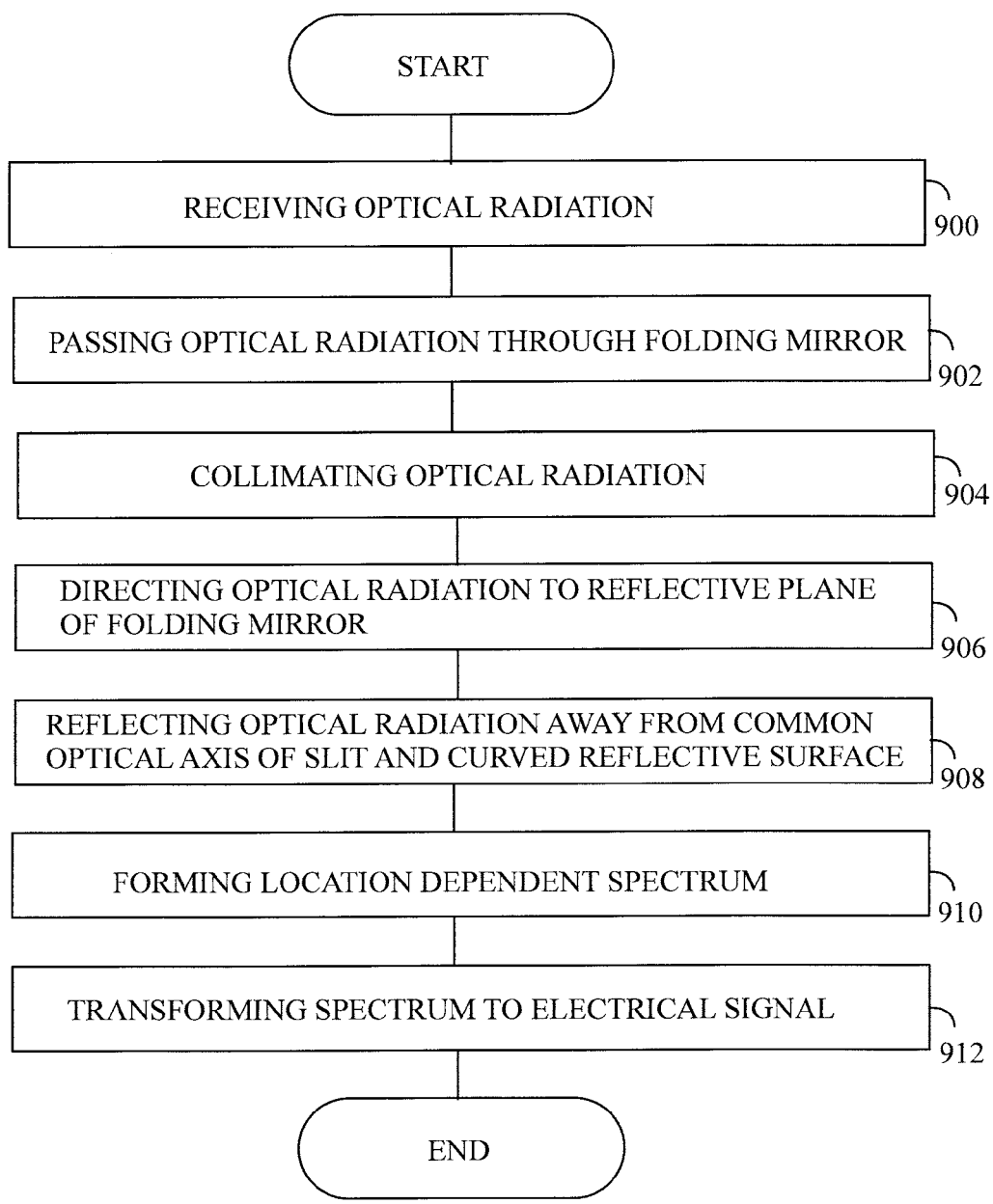
FIG. 9 presents a flow chart of the method.

FIG. 9 presents a flow chart of the method. In step 900, optical radiation from a sample is received by the slit 98. In step 902, the optical radiation is passed through a folding mirror 100 towards a curved reflective surface 114 of a collimating mirror 108, the slit 98 and the curved reflective surface 114 having a common optical axis 122 and the reflective plane 106 of the folding mirror 100 and the curved reflective surface 114 of the collimating mirror 108 facing each other. In step 904, the optical radiation 124 passed through the folding mirror 120 is collimated by the curved reflective surface 114. In step 906, the collimated optical radiation 124 is directed to the reflective plane 106 of the folding mirror 100 by the curved reflective surface 114. In step 908, the collimated optical radiation is reflected in a direction other than the common optical axis of the slit and the curved reflective surface by the reflective plane.

In step 910, a location dependent spectrum of the optical radiation received from the reflective plane 106 is formed on the two-dimensional detecting element 118 by the dispersive and imaging element 116. In step 912, the location dependent spectrum is transformed to an electrical signal by the two-dimensional detecting element 118 for processing data in the electrical signal.

It will be obvious to a person skilled in the art that, as technology advances, the inventive concept can be implemented in various ways. The invention and its embodiments are not limited to the examples described above but may vary within the scope of the claims.

What is claimed is:

1. An imaging spectrometer that acquires a spectrally-resolved image of an object or scene comprising:
    an optical collimating system comprising an elongated slit, the elongated slit having a length and a height, the length being larger than the height, a folding mirror comprising a reflective plane, and a collimating mirror comprising a curved reflective surface, the reflective plane of the folding mirror and the curved reflective surface of the collimating mirror being set to face each other, the folding mirror being configured to allow optical radiation received by the slit to pass through the folding mirror towards the curved reflective surface of the collimating mirror, the slit and the curved reflective surface having a common optical axis, the curved reflective surface being configured to collimate the optical radiation coming from the slit and direct the collimated optical radiation to the reflective plane of the folding mirror, the reflective plane being configured to reflect the collimated optical radiation in a direction other than the common optical axis of the slit and the curved reflective surface;
    a dispersive imaging element; and
    a two-dimensional detecting element, the reflective plane being configured to reflect the collimated optical radiation to the dispersive imaging element, the dispersive and imaging element being configured to form a location dependent spectrum of the received optical radiation on the two-dimensional detecting element, the two-dimensional detecting element being configured to transform the location dependent spectrum to an electrical signal for processing data in the electrical signal, wherein the dispersive and imaging element is configured to receive the collimated optical radiation formed by the collimating mirror, and the dispersive
    and imaging element comprising at least one prism, at least one transmission grating, and at least one lens, each of the at least one prism, at least one transmission grating, and at least one lens being a transmissive component, the at least one lens being on-axis with the at least one prism, the at least one lens being disposed after the at least one prism in a direction of propagation of the optical radiation, thereby enabling reduction of smile and Keystone caused by the at least one prism.

2. The imaging spectrometer of claim 1, wherein the imaging spectrometer comprises an optical element configured to form an image of a sample in the slit.

3. The imaging spectrometer of claim 1, wherein the dispersive imaging element is configured to spread, on the two-dimensional detecting element, intensities of the optical radiation of a sample as a function of wavelengths in one dimension and form an image of the sample in the slit for a location dependence for the wavelength dependent intensities in another dimension, the two-dimensional detecting element being configured to transform the optical information associated with the wavelength and location dependent intensities to an electrical signal.

4. The imaging spectrometer of claim 1, wherein the collimating mirror, the folding mirror, the dispersive imaging element and the two-dimensional detecting element are separated from each other by gaps of air.

5. The optical collimating system of claim 1, wherein the collimating mirror comprises a plano-convex lens with a metal layer on the curved surface.

6. The optical collimating system of claim 1, wherein the collimating mirror comprises a body having a curved reflective surface.

7. The optical collimating system of claim 1, wherein the folding mirror is of a transparent material and comprises a metal layer with an aperture for allowing the optical radiation received by the slit to pass through the folding mirror.

8. The optical collimating system of claim 7, wherein the aperture of the folding mirror is the slit.

9. The imaging spectrometer of claim 1, wherein the imaging spectrometer comprises a separate slit component comprising the slit.

10. The imaging spectrometer of claim 9, wherein the slit component is of a non-transparent material and comprises a through hole as the slit.

11. The imaging spectrometer of claim 9, wherein the slit component is transparent and comprises a metal layer with the slit.

12. The optical collimating system of claim 1, wherein the imaging spectrometer comprises an optically transparent body, the optically transparent body being placed between the collimating mirror and the folding mirror and attached thereto without a gap of air.

13. The imaging spectrometer of claim 1, wherein the dispersive imaging element is attached to the transparent body without a gap of air.

14. The imaging spectrometer of claim 13, wherein the detecting component is attached to the dispersive and imaging element without a gap of air.

15. A method of collimating optical radiation for imaging spectrometry that acquires a spectrally-resolved image of an object or scene, the method comprising:
    receiving, by an elongated slit, optical radiation from a sample, the elongated slit having a length and a height, the length being larger than the height;
    passing the optical radiation through a folding mirror towards a curved reflective surface of a collimating mirror, the slit and the curved reflective surface having a common optical axis, a reflective plane of the folding mirror and the curved reflective surface of the collimating mirror facing each other;
    collimating, by the curved reflective surface, the optical radiation passed through the folding mirror;
    directing, by the curved reflective surface, the collimated optical radiation to the reflective plane of the folding mirror;
    reflecting, by the reflective plane, the collimated optical radiation in a direction other than the common optical axis of the slit and the curved reflective surface;
    receiving the collimated optical radiation by a dispersive imaging element, the dispersive imaging element comprising at least one prism, at least one transmission grating, and at least one lens, each of the at least one prism, at least one transmission grating, and at least one lens being a transmissive component;

transmitting the collimated optical radiation by the at least one prism or the at least one transmission grating of the dispersive imaging element; forming, by the dispersive imaging element, a location dependent spectrum of the optical radiation received from the reflective plane on a two-dimensional detecting element;

transforming, by the two-dimensional detecting element, the location dependent spectrum to an electrical signal for processing data in the electrical signal; and reducing, by at least one lens of the dispersive imaging element, smile and Keystone caused by the at least one prism, the at least one lens being on-axis with the at least one prism, the at least one lens being disposed after the at least one prism in a direction of propagation of the optical radiation.

16. The method of claim 15, the method further comprising:

spreading, by the dispersive imaging element, intensities of the optical radiation of a sample as a function of wavelengths in one dimension on the two-dimensional detecting element;

forming, by the dispersive imaging element, an image of the sample through the slit for a location dependence for the wavelength dependent intensities in another dimension; and transforming, by the two-dimensional detecting element, the optical information associated to the wavelength and location dependent intensities to an electrical signal.

* * * * *